Patented Dec. 10, 1940

2,224,637

UNITED STATES PATENT OFFICE 2,224,637

CHOCOLATE-FLAVORED CHEWING GUM

Louis William Mahle, Melrose Park, Pa., assignor to Frank H. Fleer Corporation, Philadelphia, Pa., a corporation of Delaware No Drawing. Application December 28, 1939, Serial No. 311,419

8 Claims. (Cl. 99—135)

This invention relates to chewing gum and it comprises a chocolate-flavored chewing gum containing defatted cocoa powder as a flavoring constituent, it further comprises a chewing gum product made by intimately mixing a chewing gum with a chocolate-flavored candy whereby the entire mixture is rendered homogeneous, the chocolate-flavored candy containing defatted cocoa as a flavoring constituent.

Hereto there has been no satisfactory way available for the manufacture of a chocolate-flavored chewing gum. Others have tried to incorporate chocolate or cocoa of the usual kind in chewing gum without, however, obtaining a commercially satisfactory product. In some instances chewing gum has been coated with chocolate candy, but this does not give a product in which the chewing gum itself is actually flavored with chocolate. After the chocolate candy has been dissolved the chewing gum remains but the flavor of the chocolate has been lost.

Although others have added cocoa to chewing gum it is an observable fact that ordinary cocoa contributes undesirable properties to the chewing gum. Moreover, the flavor is quickly chewed out of the gum, and up to the present time there has been no satisfactory chocolate-flavored chewing gum on the market.

I have now discovered reasons why the addition of ordinary cocoa powder to chewing gum yields an unsatisfactory product, and have discovered ways of avoiding the disadvantages hitherto met with. The present invention is based upon the discovery that the reason why chewing gum containing ordinary cocoa is unsatisfactory is because of the cocoa butter present in the cocoa powder. Commercial cocoa powder contains about 20% to 22% of cocoa butter. This low melting fat, I have discovered, materially changes the chewing characteristics of chewing gum to which it is added making it very soft and sticky. Such cocoa powder is made from defibrinated cocoa beans by grinding and pressing the beans for the removal of some of the fat or cocoa butter normally present.

I have now discovered that when a defatted cocoa is incorporated in chewing gum the disadvantages hitherto observed with ordinary cocoa are overcome. By a "defatted cocoa" I mean a cocoa powder having a fat content of not more than about 10% and frequently as low as 1%. A cocoa having a butter fat content of about 1% is extremely satisfactory for imparting a chocolate flavor to chewing gum, and I make special claim to this feature.

The present invention also includes special ways of incorporating the defatted cocoa in the chewing gum base material. I have discovered that the best way of making a chocolate-flavored chewing gum is by mixing a prepared chewing gum, which can be flavored or not as desired, with a chocolate-flavored candy mixture, the two prepared mixtures being pulled on a hook or pulling machine until they are thoroughly admixed together and rendered homogeneous.

I am aware that others have prepared chewable confections by amalgamating paraffin while molten with a premade candy as in the patent to Aubin 280,115, but the present invention distinguishes from that patent in that separate batches of plastic chewing gum and candy are mixed in substantial proportions and pulled on a hook. I do not first melt the chewing gum and then admix it with a premade candy.

More specifically, I first make up a chocolate-flavored candy consisting of about 50 parts by weight of sugar, 20 parts by weight of a defatted cocoa having a fat content of about 1%, 100 parts by weight of corn syrup or glucose, 20 parts by weight of invert sugar and 10 parts by weight of powdered skim milk. These ingredients are mixed together and cooked at about 245° F. in the usual way for making candy. A little vanilla flavoring can be added if desired.

After the cooking operation the candy is poured on a slab and after cooling, a slab of premade chewing gum is admixed with the candy and the entire mixture pulled on a pulling machine until homogeneous. Preferably, equal weights of candy and chewing gum are used. The chewing gum can be made in any convenient way from the usual constituents. I lay no claim to any special chewing gum base, but a suitable one can contain 30 parts by weight of a gutta, such as gutta jelutong, 16 parts by weight of a rosin ester gum, preferably hydrogenated, 7 parts by weight of rubber latex, 7 parts by weight of chalk, 22 parts by weight of candelilla wax and 16 parts by weight of a para-coumarone resin. About 15 parts of the base are mixed with 65 parts of powdered sugar and 20 parts of corn syrup to make the chewing gum, and this in turn is then mixed with the slab of chocolate-flavored candy. There are countless variations in the formula for the chewing base, as well as the final chewing gum. Chewing gums containing chicle can be used in place of that given above. Those skilled in the art will understand that the chewing gum can be prepared from any of the usual chewing gum bases and can be sweetened or flavored as desired prior to incorporating with the chocolate candy. I wish to emphasize that in the process I am now describing the chewing gum and the candy are pulled on a pulling machine until the entire mixture appears to be substantially homogeneous.

For best results it is desirable that the defatted cocoa be made up into a candy and the candy then combined with the chewing gum. This gives a chocolate-flavored chewing gum having the best flavor, and the flavor remains in the gum even after a prolonged chewing. But a fairly good chewing gum can be prepared by adding defatted cocoa powder to the ordinary chewing gum base along with sugar, vanilla and any other desired flavoring materials.

Wide variation can be made in the proportions and constituents of the chocolate candy and I do not wish to be limited to any special candy formula. The candy, when somewhat cooled on the slab, should have the right consistency for enabling it to be pulled along with the chewing gum, but this characteristic will, of course, be obvious to those skilled in the art.

Defatted cocoa powders having a butter fat content as low as 1% are available in the open market, and I make no claim to ways of preparing such a cocoa powder. It is indeed surprising a cocoa powder of such low fat content gives such marked improvement in the flavor characteristics and chewing characteristics of the gum. Insofar as I am aware I am the first to have discovered that marked improvement is obtained when a defatted cocoa rather that the ordinary cocoa having about 20% of fat is used.

Having thus described my invention, what I claim is:

1. Chewing gum containing a cocoa powder having a fat content of not more than about 10%.

2. Chewing gum containing a cocoa having a fat content of about 1%.

3. The method of making a chocolate-flavored chewing gum which comprises admixing a defatted cocoa powder having a fat content of not more than about 10% with a chewing gum base.

4. The process of making a chocolate-flavored chewing gum which comprises admixing a defatted cocoa powder having a fat content of about 1% with a chewing gum base.

5. The process of making a chocolate-flavored chewing gum which comprises admixing a premade chocolate-flavored candy and a premade chewing gum while both substances are plastic until the mixture is substantially homogeneous throughout, the chocolate-flavored candy containing a defatted cocoa powder having a fat content of not more than about 10%.

6. The process of making a chocolate-flavored chewing gum which comprises admixing a premade chocolate-flavored candy and a premade chewing gum while both substances are plastic until the mixture is substantially homogeneous throughout, the chocolate candy containing a defatted cocoa powder having a fat content of about 1%.

7. A chocolate-flavored chewing gum composed of a homogeneous mixture of a premade chocolate-flavored candy and a chewing gum, the chocolate-flavored candy containing a defatted cocoa powder having a fat content of not more than about 10%.

8. A chocolate-flavored chewing gum composed of a homogeneous mixture of a premade chocolate-flavored candy and a chewing gum, the chocolate-flavored candy containing a defatted cocoa powder having about 1% of fat.

LOUIS WILLIAM MAHLE.